(12) United States Patent
Mealey et al.

(10) Patent No.: US 9,021,491 B2
(45) Date of Patent: Apr. 28, 2015

(54) DUAL MODE READER WRITER LOCK

(75) Inventors: Bruce Mealey, Austin, TX (US); James Bernard Moody, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 12/723,717

(22) Filed: Mar. 15, 2010

(65) Prior Publication Data

US 2011/0225587 A1 Sep. 15, 2011

(51) Int. Cl.
*G06F 9/46* (2006.01)
*G06F 9/52* (2006.01)

(52) U.S. Cl.
CPC ........................................ *G06F 9/52* (2013.01)

(58) Field of Classification Search
None
See application file for complete search history.

(56) References Cited

U.S. PATENT DOCUMENTS

| | | | | |
|---|---|---|---|---|
| 5,522,077 | A * | 5/1996 | Cuthbert et al. | 1/1 |
| 6,154,844 | A * | 11/2000 | Touboul et al. | 726/24 |
| 6,546,443 | B1 | 4/2003 | Kakivaya et al. | |
| 6,792,601 | B1 | 9/2004 | Dimpsey et al. | |
| 6,823,511 | B1 | 11/2004 | McKenney et al. | |
| 7,159,221 | B1 * | 1/2007 | Willen et al. | 718/104 |
| 2002/0078284 | A1 * | 6/2002 | McKenney | 710/200 |
| 2003/0097360 | A1 * | 5/2003 | McGuire et al. | 707/8 |
| 2005/0149634 | A1 | 7/2005 | McKenney | |
| 2006/0230411 | A1 | 10/2006 | Richter et al. | |
| 2007/0239915 | A1 | 10/2007 | Saha et al. | |
| 2010/0275209 | A1 * | 10/2010 | Detlefs | 718/102 |

FOREIGN PATENT DOCUMENTS

WO 2007028807 A1 3/2007

OTHER PUBLICATIONS

Onodera et al; A Study of Locking Objects With Bimodal Fields, Oct. 1999, Sigplan notices ACM, USA, p. 223-237.
Lim, Reactive Synchronization Algorithms for Multiprocessors, 1-162, Massachusetts Institute of Technology, Feb. 1995, p. 1-162.
European Patent office, International Searching Authority, EP2011052189, Jun. 15, 2011.
IBM-; Method for Automatically Switching Between Read and Write (Shared and Exclusive) Locks on a Resource While Guaranteeing Deadlock Avoidance; ip.com/ibm TDB, Oct. 8, 2008.
Holm-et al.; "Adaptive Lock Escalation/De-escalation"; ip.com/ibm TDB; Jan. 1, 1992.

(Continued)

*Primary Examiner* — Abdullah Al Kawsar
*Assistant Examiner* — Wissam Rashid
(74) *Attorney, Agent, or Firm* — Garg Law Firm, PLLC; Rakesh Garg; Damion Josephs

(57) ABSTRACT

A system, and computer usable program product for a dual mode reader writer lock are provided. A contention condition is determined in using an original lock. The original lock manages read and write access to a resource by several processes executing in the data processing system. The embodiment creates a set of expanded locks for use in conjunction with the original lock. The original lock and the set of expanded locks forming the dual mode reader writer lock, which operates to manage the read and write access to the resource. Using an index within the original lock, each expanded lock is indexed such that each expanded lock is locatable using the index. The contention condition is resolved by distributing requests for acquiring and releasing the read access and write access to the resource by the several processes across the original lock and the set of expanded locks.

10 Claims, 9 Drawing Sheets

(56) References Cited

OTHER PUBLICATIONS

Hossain-et al.; "Improving Support for Locality and Fine-Grain Sharing in Chip Multiprocessors"; ACM Digital Library; pp. 155-165, Oct. 2008.

Baugh-et al.; "Using Hardware Memory Protection to Build a High-Performance, Strongly-Atomic Hybrid Transactional Memory"; ACM/IEEE, pp. 115-125, 2008.

Lim, "Reactive synchronization algorithms for multiprocessors",Feb. 1995, pp. 1-162.

Holm et al.: "Adaptive Lock Escalation/De-escalation": ip.com/ ibm TDB: Jan. 1, 1992.

Australian Government, IP Australia, Notice of Acceptance, Application No. 2011229395, Mar. 21, 2014.

Lim, Reactive Synchronization algorithms for multiprocessors, 1995.

CN Patent Office, AUS920100001CN1, Non-Final Office Action, Sep. 28, 2014.

* cited by examiner

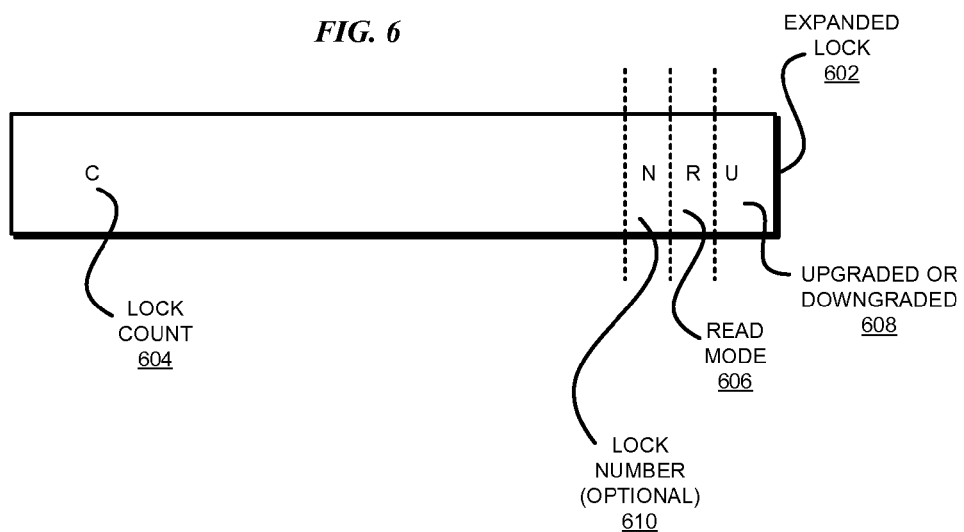
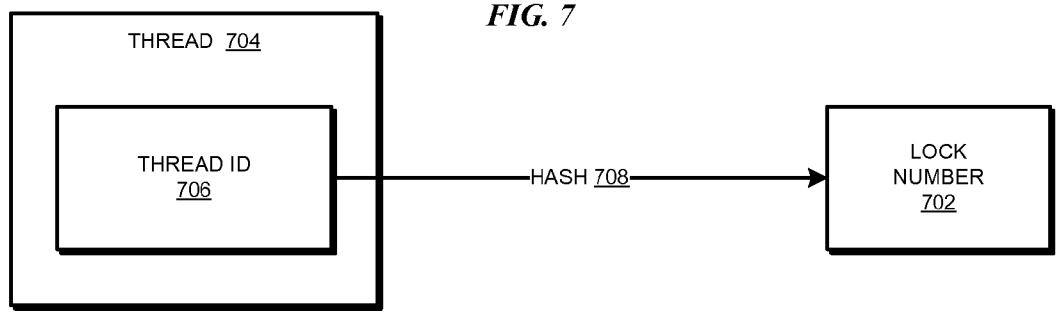

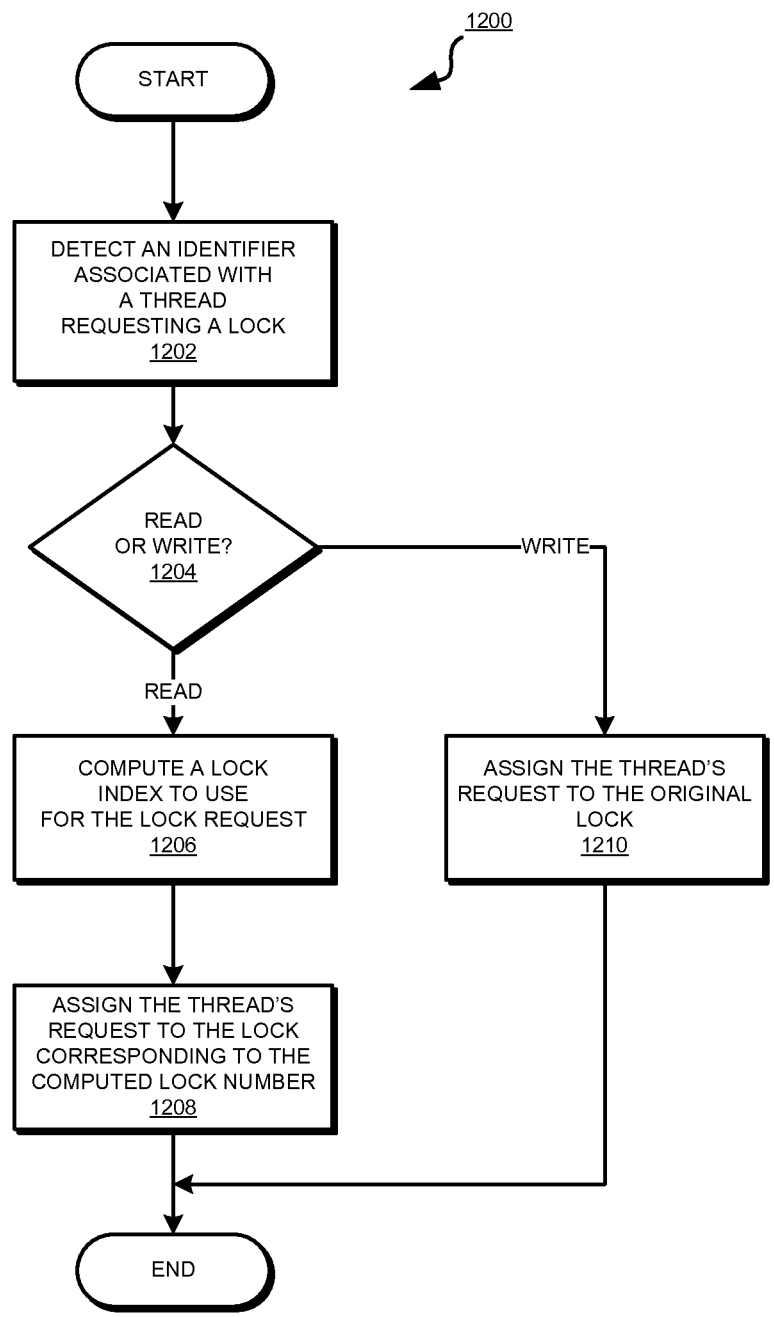

DUAL MODE READER WRITER LOCK

RELATED APPLICATIONS

The present invention is related to similar subject matter of co-pending and commonly assigned U.S. patent application Ser. No. 12/723,714 entitled "USING A DUAL MODE READER WRITER LOCK," filed on Mar. 15, 2010, and U.S. patent application Ser. No. 12/723,719 entitled "RETOOLING LOCK INTERFACES FOR USING A DUAL MODE READER WRITER LOCK," filed on Mar. 15, 2010, which are hereby incorporated by reference.

BACKGROUND OF THE INVENTION

1. Field of the Invention

The present invention relates generally to an improved data processing system, and in particular, to improving the reading and writing of data. Still more particularly, the present invention relates to a system, and computer usable program code for a dual mode reader writer lock (DML).

2. Description of the Related Art

Processes executing in a data processing system read and write data associated with a variety of resources. A data file, a memory location, and an address on a disk are some examples of such a resource.

When a process executing in a data processing system has to read or write data from or to a resource, the operating system has to sequence and control the read/write requests. This control is important in ensuring that read and write requests for the same resource by multiple processes do not compromise the integrity of the data of that resource. For example, a process should not be allowed to read data while another process is writing that data. Multiple processes may be allowed to read the same data simultaneously but not in conjunction with one or more processes attempting to write that data.

To implement these and other rules for reading and writing data, operating systems implement locks. A read write lock is a data structure whose data has to be set or reset, or incremented or decremented before a process can read or write the data of an associated resource. Such a lock is also known as a reader writer lock (RWL) or a complex lock.

Setting or incrementing a RWL is called acquiring or getting a lock. Resetting or decrementing a RWL is called releasing or freeing a lock. A reader lock or a read lock is a state of a RWL that permits a process or thread to read the resource associated with the RWL. Multiple processes or threads can concurrently acquire a read lock on a common resource. A writer lock or a write lock is a state of a RWL that permits a thread to write data to the resource associated with the RWL. Only a single thread can acquire a single write lock on the resource at any given time, and no thread can hold or acquire a read lock while another thread holds a write lock on the resource.

Typically, a RWL is implemented using a single data word. A data word is a specific number of bits that are handled together in the architecture of an operating system. In one case, the size of a data word may be the number of bits that can be held in a single register in a particular processor of the data processing system. In another case, the data word size may be the minimum number of bits can be transferred from a given memory to a given processor. Commonly available operating systems have implemented data word sizes of sixteen, thirty two, sixty four, and one hundred and twenty eight bits. A data word may be of any size suitable for a particular implementation.

When an operating system manipulates a RWL, that manipulation must not be interrupted for the integrity of the lock. In other words, all the instructions for setting or resetting, or incrementing or decrementing a RWL must be executed from start to finish without being interrupted or preempted by another process. An operation whose set of instructions must be executed in this manner is called an atomic operation. Manipulation of a RWL is an atomic operation. Acquiring a lock and releasing a lock are examples of lock manipulations performed as atomic operations.

At any given time during the operation of a data processing system, several processes or threads may wish to acquire a lock for a common resource in close temporal proximity of one another. Several other processes or threads that have already acquired the lock may wish to release the lock at or near the same time. Some processes or threads wishing to acquire or release the lock may deal with read locks on the resource, while others may deal with write locks.

SUMMARY OF THE INVENTION

The illustrative embodiments provide a system, and computer usable program product for a dual mode reader writer lock. An embodiment of the invention determines a contention condition in using an original lock. The original lock corresponds to a resource available on a data processing system. The original lock manages read access and write access to the resource by several processes executing in the data processing system. The embodiment creates a set of expanded locks for use in conjunction with the original lock. The original lock and the set of expanded locks forming the dual mode reader writer lock. The dual mode reader writer lock operates to manage the read access and write access to the resource. The embodiment, using an index within the original lock, indexes each expanded lock in the set of expanded locks such that each expanded lock is locatable using the index. The embodiment resolves the contention condition by distributing requests for acquiring and releasing the read access and write access to the resource by the several processes across the original lock and the set of expanded locks.

In another embodiment, the original lock is a modified form of a preexisting reader writer lock such that the preexisting reader writer lock can hold a set of identifiers usable in operating in conjunction with the set of expanded locks. The embodiment further designates an expanded lock in the set of expanded lock as a reader lock. By so designating, the designated expanded lock is usable for acquiring, holding, and releasing only a read lock on the resource.

Another embodiment further receives from a process, a request to acquire or release a read lock on the resource. The embodiment assigns the request to an expanded lock in the dual mode reader writer lock.

In another embodiment, a second request from the process to acquire or release a write lock on the resource is assigned to the original lock.

In another embodiment, the expanded lock is selected from the set of expanded locks by computing an index value from an identifier associated with the process. The index value resolves to the expanded lock.

In another embodiment, the expanded lock is selected from the set of expanded locks such that the expanded lock has an affinity to a processor of the data processing system.

Another embodiment further receives a request to acquire or release a write lock on the resource. The embodiment assigns the request to the original lock in the dual mode reader writer lock.

In another embodiment, the dual mode reader writer lock operates in a first mode using only the original lock when the contention condition does not exist. The dual mode reader writer lock operates in a second mode using the original lock and the set of expanded locks when the contention condition exists. The dual mode reader writer lock switches from the first mode to the second mode when the contention condition arises. The dual mode reader writer lock switches from the second mode to the first mode when the contention condition abates.

In another embodiment, the switching from the first mode to the second mode removes the contention condition by allowing several atomic operations for locks on the resource to concurrently execute on the original lock and an expanded lock in the set of expanded locks, or two expanded locks in the set of expanded locks.

Another embodiment further allocates a region in a memory for use as locks. The creating the set of expanded locks designates a set of spaces for the set of expanded locks in the region.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 6 depicts a block diagram of an example configuration of an expanded lock or a reader lock element in accordance with an illustrative embodiment;

FIG. 7 depicts a block diagram of an example method of allocating processes or threads to specific original or expanded locks in a DML in accordance with an illustrative embodiment;

FIG. 12 depicts a process of assigning threads or processes to specific original or expanded locks in a DML in accordance with an illustrative embodiment.

DETAILED DESCRIPTION OF THE PREFERRED EMBODIMENT

Figure 1:
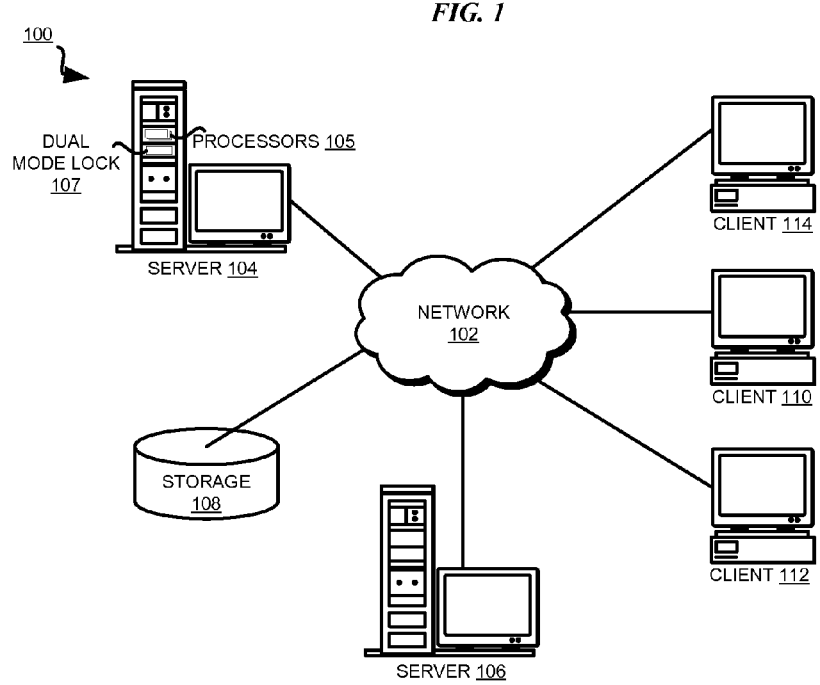
FIG. 1 depicts a pictorial representation of a network of data processing systems in which illustrative embodiments may be implemented.

Under certain circumstances, several atomic operations for each request to acquire or release a lock from several processes or threads may be pending in a data processing system. The invention recognizes that inundating the data processing system with several atomic operations for a RWL can adversely affect the performance of the data processing system.

For the clarity of the description, "process" is used to mean a process or a thread of a process. An operation with respect to a process is similarly applicable to a thread, and an operation with respect to a thread is similarly applicable to a process within the scope of the invention.

The invention further recognizes that under certain other circumstances, the data structure of the lock may be saturated and may not be able to accommodate any more lock requests. For example, a data word of hypothetical size of two bits will be saturated if four threads are already holding read locks on the associated resource because two bits can be used to count only from 0 to 4. A fifth thread requesting a read lock cannot be accommodated until one of the other four processes holding a read lock releases its read lock. The invention recognizes that a backlog of atomic operations waiting to execute on a RWL in a data processing system can also adversely affect the performance of the data processing system.

These circumstances are example scenarios where contention for RWLs arises in a data processing system. The invention recognizes that a contention for RWL is likely in a data processing system when the number of processes or threads contending for a RWL increase beyond a threshold number. The invention further recognizes that as the number of processors in a data processing system increase, such as in a multiprocessor data processing system or logical partition, the number of processes and threads also rises leading to the RWL contentions.

The illustrative embodiments used to describe the invention generally address and solve the above-described problems and other problems related to RWLs. The illustrative embodiments provide a computer usable program product, and data processing system for a dual mode reader writer lock.

An embodiment of the invention may enable the data processing system to process atomic operations for a RWL with a reduced affect on the system performance as compared to the presently configured data processing system when the number of atomic operations reaches a threshold number. For example, for the same number of atomic operations performed for a single RWL, a data processing system implementing an embodiment of the invention may demonstrate better system performance as compared to a data processing system without the embodiment.

An embodiment of the invention may also allow more processes and threads to acquire and release locks concurrently with a diminished adverse affect on the system performance as compared to a presently configured data processing system. For example, for the same system performance, a data processing system employing an embodiment of the invention may allow more processes to acquire read locks on a resource as compared to a data processing system without the embodiment.

The illustrative embodiments are described with respect to data, data structures, and identifiers only as examples. Such descriptions are not intended to be limiting on the invention. For example, an illustrative embodiment described with respect to 64 bit data word may be implemented using a 128 bit data word in a similar manner within the scope of the invention.

Furthermore, the illustrative embodiments may be implemented with respect to any type of data processing system. For example, an illustrative embodiment described with respect to a multiprocessor standalone data processing system may be implemented in a multiprocessor logical partition system within the scope of the invention.

The illustrative embodiments are further described with respect to certain parameters, attributes, and configurations only as examples. Such descriptions are not intended to be limiting on the invention. An embodiment of the invention may be implemented with respect to any type of data processing system, such as, for example, any type of client system, server system, platform, or a combination thereof.

An application implementing an embodiment may take the form of data objects, code objects, encapsulated instructions, application fragments, services, and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
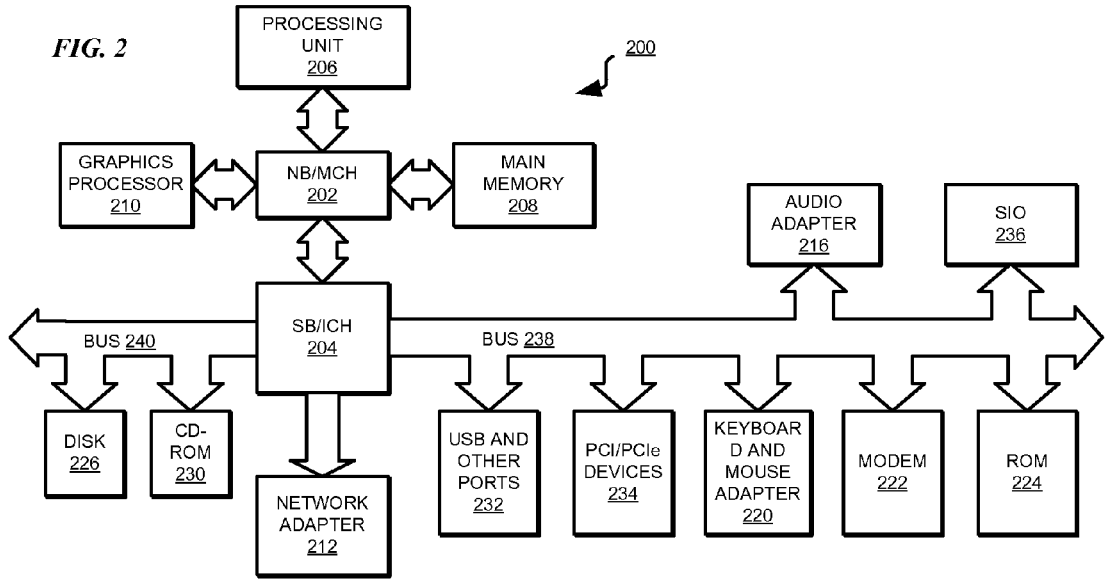
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include multiple processors 105. Other depicted data processing systems may also include more than one processor in a similar manner (not shown). Server 104 may further include DML 107. DML 107 may be a DML according to an embodiment of the invention. DML 107 may be implemented in server 104 in conjunction with other RWLs without limitation. Furthermore, DML 107 may be configured in a data processing system other than server 104, such as in server 106, and may be accessible to server 104 over network 102.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
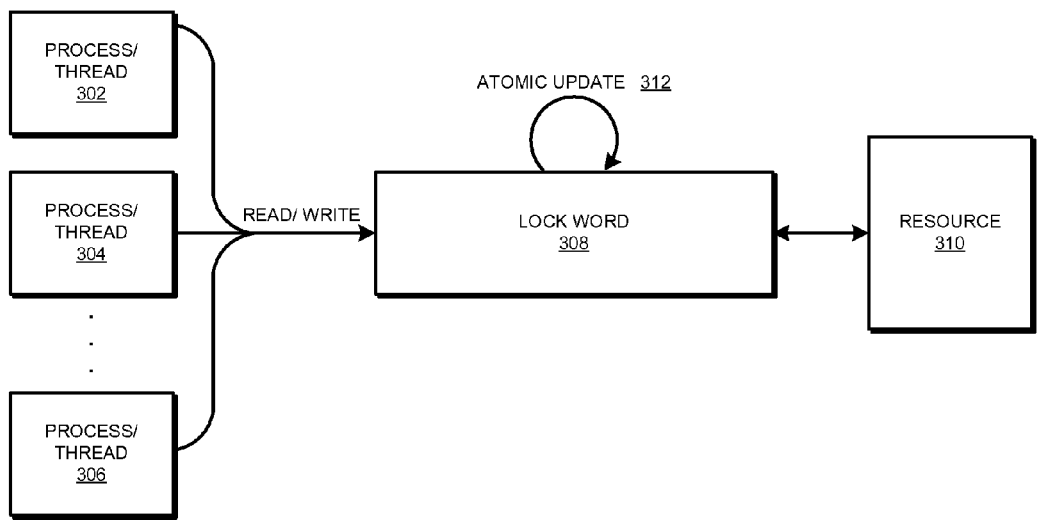
FIG. 3 depicts a block diagram of operations using a RWL in a data processing system with respect to which an illustrative embodiment may be implemented.

With reference to FIG. 3, this figure depicts a block diagram of operations using a RWL in a data processing system with respect to which an illustrative embodiment may be implemented. Processes 302, 304, and 306 may be processes or threads in a data processing system, such as server 104 in FIG. 1.

Processes 302, 304, and 306 may be contending to acquire or release a RWL implemented using lock word 308. The RWL of lock word 308 may be associated with resource 310 which processes 302, 304, and 306 may be contending to read or write. The RWL of lock word 308 may be a RWL as used in a presently available operating system. For example, process 302 may be requesting to acquire a read lock on resource 310. Process 304 may be requesting to acquire a write lock on resource 310. Process 306 may be requesting to release a read lock previously acquired on resource 310.

Each request to acquire or release a lock on resource 310 causes an atomic operation to execute or be scheduled to execute on lock word 308. Atomic operations 312 represent one or more of such atomic operations on lock word 308.

An operating system that implements lock word 308 and executes atomic operations 312 is likely to degrade in performance as more processes or threads similar to processes 302, 304, and 306, request to acquire or release the RWL represented by lock word 308.

For example, acceptable performance of the data processing system operating as shown in FIG. 3 may be defined by a performance metric remaining at or above a threshold value. In one embodiment, a total number of processes similar to processes 302, 304, and 306, exceeding a threshold number of processes may be interpreted as causing the performance of the data processing system to be unacceptable. For example, in one example configuration, 5000 total threads or processes contending to execute atomic operations on various RWLs may be interpreted as causing the performance of the data processing system to be unacceptable.

In another embodiment, a total number of processes similar to processes 302, 304, and 306, exceeding a threshold number of processes for a particular RWL may be interpreted as causing the performance of the data processing system to be unacceptable. For example, in one example configuration, 1000 threads or more contending to acquire or release a lock using lock word 308 may be considered a cause of degraded performance.

In another embodiment, a total number of processes similar to processes 302, 304, and 306, exceeding a threshold ratio of processes to the number of processors may be interpreted as causing the performance of the data processing system to be unacceptable. For example, in one example configuration, 1000 threads or more per processor contending to acquire or release a RWL may be considered a cause of degraded performance.

Figure 4:
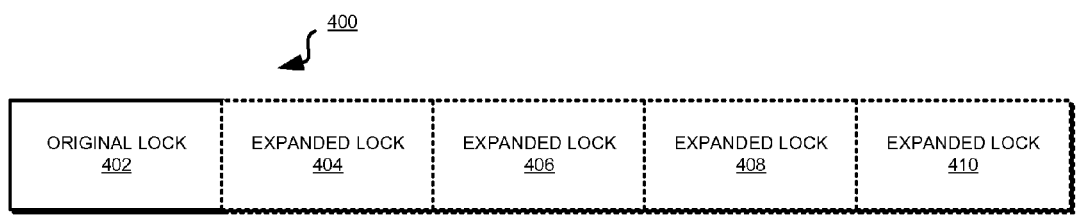
FIG. 4 depicts a block diagram of a DML in accordance with an illustrative embodiment.

With reference to FIG. 4, this figure depicts a block diagram of a DML in accordance with an illustrative embodiment. DML 400 according to an embodiment includes original lock 402. Original lock 402 may be a lock word as used to represent an existing RWL, such as lock word 308 in FIG. 3 and is modified according to an embodiment of the invention to be expandable to DML 400. Original lock 402 is also called a "containing lock" or a "containing element" of a lock.

DML 400 further includes expanded locks 404, 406, 408, and 410. Original lock 402 and expanded locks 404, 406, 408, and 410 operate as a single lock on the resource that was managed by the existing RWL before the RWL was converted into DML 400. In other words, original lock 402, and each of expanded locks 404, 406, 408, and 410 form lock elements of a single lock. A lock management mechanism, such as a component of an operating system, can operate on each lock element separately, individually, and independent of operations on other lock elements in the same lock—DML 400—for managing locks on the same resource.

Each of expanded locks 404-410 may be memory spaces usable for storing lock information. For example, in one embodiment, upon boot up, an operating system may designate a suitable memory area of a suitable size as reserved for creating and storing lock words or for other use in conjunction with a RWL or a DML. An expanded lock is also called an "expanded element" or a "reader lock element".

Expanded locks 404-410 may be memory spaces of same or different sizes in such designated memory area. For example, in one embodiment, expanded locks 404-410 may each be a single word in size. In another embodiment, some of expanded locks 404-410 may be 1 word in size whereas other expanded locks in expanded locks 404-410 may be larger or smaller as suitable for a particular implementation.

In another embodiment, any memory area may be usable for storing expanded locks 404-410. For example, in a distributed data processing environment, some expanded locks in expanded locks 404-410 may be located in a memory region closer to one processor, and other expanded locks may be located in a different memory region closer to a different processor. In other words, expanded locks 404-410 may be distributed in any region of memory considering affinity to processors, proximity to devices, or other considerations.

Four expanded locks are depicted in FIG. 4 only as an example for the clarity of the description. Any number of expanded locks may be created, and different original locks may be expanded differently, within the scope of the invention. For example, for expanding one RWL, an implementation may create four expanded locks in the manner of an illustrative embodiment. For expanding another RWL, the implementation may create eight, sixteen, or any other number of expanded locks.

Additionally, original lock 402 and expanded locks 404-410 are shown as being contiguous only as a logical view and are not intended to be limiting on the invention as depicted. Original lock 402 and each of expanded locks 404-410 may be located anywhere in a given memory as suitable in a particular implementation within the scope of the invention.

In accordance with an illustrative embodiment, original lock 402 is expanded using expanded locks 404-410. Expanding original lock 402 in this manner allows data of the lock to be maintained and manipulated across more than one lock word of memory space. A lock is now represented collectively by original lock 402 and expanded locks 404-410. Atomic operations with respect to thus-represented DML 400 can proceed discretely with respect to the memory space of original lock 402 or of any of expanded locks 404-410.

For example, assume that original lock 402 and each of expanded locks 404-410 are one data word in size. Certain processes may acquire or release DML 400 using the data word of original lock 402. The atomic operations associated with such lock operations will be executed on the data word representing original lock 402. Certain other processes may similarly acquire or release DML 400 using the data word of expanded lock 406. The atomic operations associated with such lock operations will generally be executed on the data word representing expanded lock 406. Other processes may similarly be assigned to original lock 402, or one of expanded locks 404-410.

Certain conditions, as described elsewhere in this disclosure, may cause a process assigned to one expanded lock to execute an operation on the original lock or a different expanded lock. Furthermore, all write locks are acquired, held, and released by any process using original lock 402. Read locks acquired, held, and released by various processes may be distributed across original lock 402 and any of expanded locks 404-410 in the manner of an embodiment of the invention.

Presently, two or more atomic operations to manipulate a RWL must wait to be executed sequentially on the memory space of the RWL as presently used. Expanding the RWL into DML 400 according to this embodiment advantageously enables an operating system to execute such two or more atomic operations on different memory spaces associated with the same DML.

DML 400 operates in two modes. When contention for lock on a resource is below a threshold value, DML 400 may not use expanded locks 404-410 and operate only using original lock 402. In such a circumstance, all read and write locks on the resource are acquired, held and released using original lock 402. When the contention for the lock reaches or exceeds the threshold, DML 400 expands to use any number of expanded locks 404-410 and operates in the manner of an embodiment.

Figure 5:
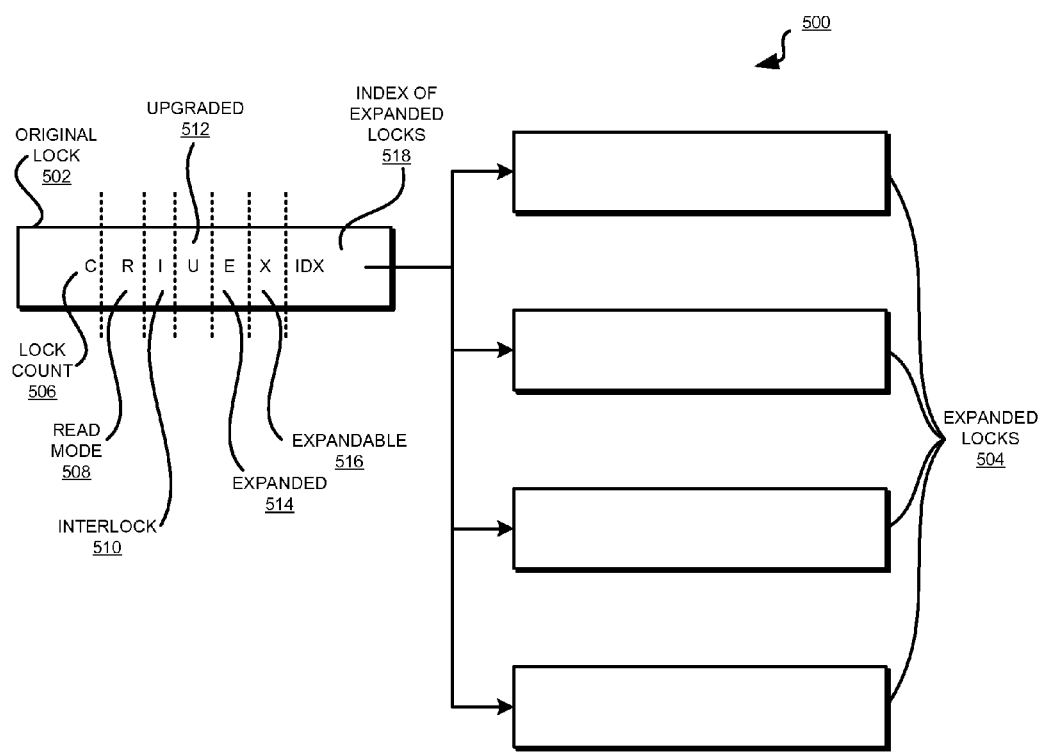
FIG. 5 depicts a block diagram of a configuration of a DML to use expanded locks in accordance with an illustrative embodiment.

With reference to FIG. 5, this figure depicts a block diagram of a configuration of a DML to use expanded locks in accordance with an illustrative embodiment. DML 500 may be analogous to DML 400 in FIG. 4. Containing or original lock 502 may be used as original lock 402 in FIG. 4. Parts of expanded locks 504 may be used as corresponding parts of expanded locks 404-410 in FIG. 4.

Original lock 502 includes lock count 506. Lock count 506 are a set of bits that store the number of locks that are being held in original lock 502 at any given time. A set of bits is one or more bits.

Original lock 502 further includes a set of indicators. An indicator is a set of bits that indicate a particular condition or a particular value of a condition. A set of indicators is one or more indicators. An indicator may also be used to determine that a rule must be executed or has executed.

An example indicator may only span 1 bit and may be set or reset to indicate an on/off condition of a device, availability/non-availability of data or option, and other similar conditions. Another example indicator may span several bits, for example 2 bits to store a count from 0 to 4 of a particular condition. Lock count 506 may be an example of such a multi-bit indicator.

Original lock 502 may further include "read-mode" indicator 508, "interlock" indicator 510, "upgraded" indicator 512, "expanded" indicator 514, "expandable" indicator 516, and index of expanded locks 518. Indicators 508-516 form an example set of indicators and are selected for describing the illustrative embodiment without limitation on the scope of the invention.

Read-mode indicator 508 may be used to indicate whether original lock 502 is being used to hold only read locks or both read locks and write locks. For example, if read-mode indicator 508 is implemented as a single bit indicator, bit value of 0 may indicate the condition that original lock 502 is holding write lock count in lock count 506. Bit value of 0 may also indicate that original lock 502 is not holding any locks at all in lock count 506 and is available for holding any type of lock. Conversely, bit value of 1 may indicate the condition that original lock 502 is holding at least one read lock count in lock count 506.

Interlock indicator 510 may be used for handling certain conditions arising during the use of DML 500, as described elsewhere in the disclosure. For example, when original lock 502 is updated by an atomic operation that will result in a particular state of original lock 502, a rule may require that interlock indicator 510 must be set prior to that operation.

Expanded indicator 514 may indicate to a process whether DML 500 is using expanded locks 504. For example, if expanded indicator 514 is implemented as a single bit indicator, bit value of 0 may indicate the condition that DML 500 is not using expanded locks 504. Conversely, bit value of 1 may indicate the condition that DML 500 has been expanded to use one or more expanded locks in expanded locks 504.

Upgraded indicator 512 may be used to indicate that a contention condition on the lock had occurred in the past causing a simple RWL to be transformed into DML 500 and the lock exists in the form of DML 500. In other words, upgraded indicator 512 may be used to inform a process in which of the two modes DML 500 is operating. For example, if upgraded indicator 512 is implemented as a single bit indicator, bit value of 0 may indicate the condition that DML 500 is operating using only original lock 502. Conversely, bit value of 1 may indicate the condition that DML 500 is using expanded locks 504 in conjunction with original lock 502.

Expandable indicator 516 may indicate whether DML 500 is expandable or capable of using expanded locks 504. For example, if expandable indicator 516 is implemented as a single bit indicator, bit value of 0 may indicate the condition that DML 500 is not capable of using expanded locks 504. Conversely, bit value of 1 may indicate the condition that DML 500 may be expanded to use one or more expanded locks in expanded locks 504. For example, certain RWLs may be preferable in non-expanded form over the expanded form, and expandable indicator 516 may be utilized to make that choice.

Expandable indicator 516 may be optional in one embodiment. When used in an embodiment, expandable indicator 516 may be used as a switch in case the implementation chooses not to have all locks expanded for some reason. Using expandable indicator 516 in this manner gives the embodiment the capability to selectively disallow expansion for particular locks. In an embodiment without expandable indicator 516, the embodiment may deem all locks to be expandable.

Index of expanded locks 518 may be configured to hold references to each of any number of expanded locks in expanded locks 504. Using index 518, a process requesting to acquire or release a lock may traverse from original lock 502 to any expanded lock in expanded locks 504 to perform an operation thereon corresponding to the request.

Figure 5A:
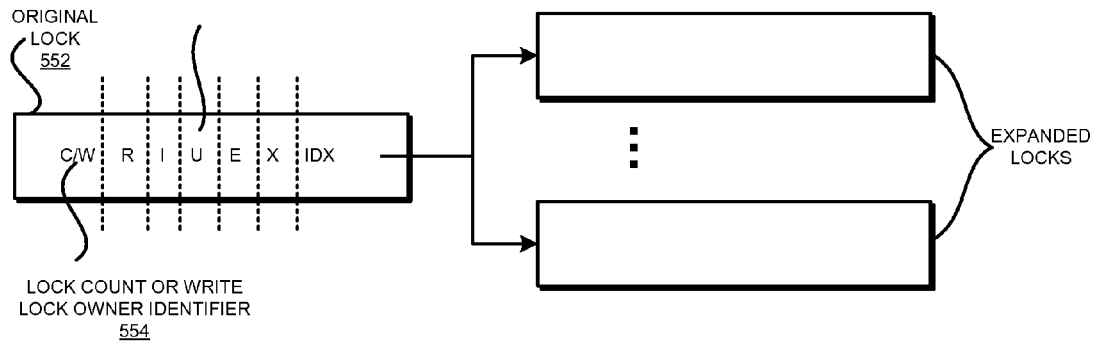
FIG. 5A depicts a block diagram of an alternate embodiment of a DML in accordance with an illustrative embodiment.

With reference to FIG. 5A, this figure depicts a block diagram of an alternate embodiment of a DML in accordance with an illustrative embodiment. DML 550 may be similar to DML 500 in FIG. 5. Original lock 502 in DML 550 may be analogous to original lock 502 in FIG. 5.

The embodiment of this figure may be usable when original lock 572 is used to store a write lock. Lock count 506 in FIG. 5 may be used to hold an identifier associated with a thread that may use DML 550 to store the write lock. Such a thread would be the owner of the write lock. Accordingly, some or all the bits of lock count 506 in FIG. 5 may be used to store lock count or write lock owner identifier 554.

Figure 5B:
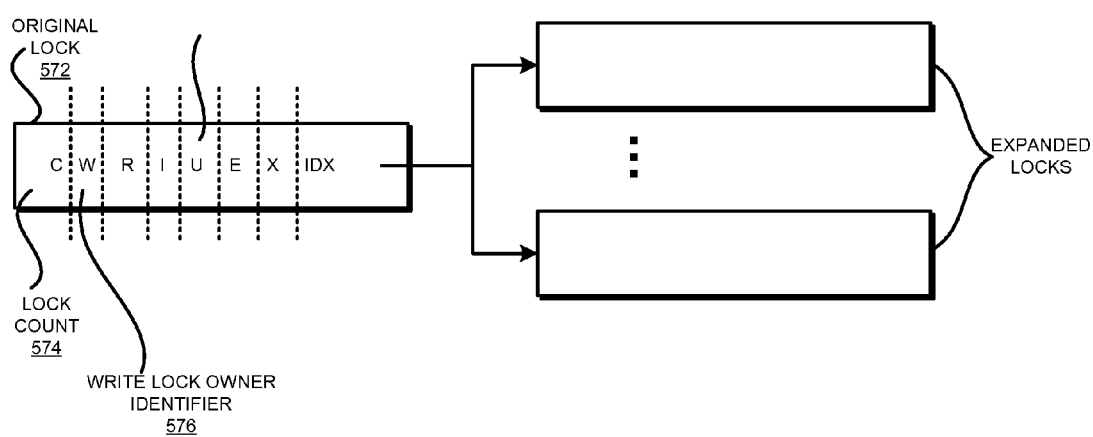
FIG. 5B depicts a block diagram of another alternate embodiment of a DML in accordance with an illustrative embodiment.

With reference to FIG. 5B, this figure depicts a block diagram of another alternate embodiment of a DML in accordance with an illustrative embodiment. DML 570 may be similar to DML 500 in FIG. 5. Original lock 572 in DML 570 may be analogous to original lock 502 in FIG. 5.

The embodiment of this figure may be alternatively usable when original lock 572 is used to store a write lock. Lock count 574 may be similar to lock count 506 in FIG. 5. Original lock 572 may further include write lock owner identifier 576. Identifier 576 may be used to hold an identifier associated with a thread that may use DML 570 to store the write lock. Lock count 574 may continue to hold values similar to lock count 506 in FIG. 5.

With reference to FIG. 6, this figure depicts a block diagram of an example configuration of an expanded lock or a reader lock element in accordance with an illustrative embodiment. Expanded lock 602 may be implemented as any of the expanded locks in expanded locks 504 in FIG. 5.

Expanded lock 602 includes lock count 604. Lock count 604 keeps track of the number of locks held in expanded lock 602. Lock count 604 bits operate and are usable in a manner similar to bits of lock count 504 in FIG. 5. In an implementation of a DML, such as DML 500 of FIG. 5 using expanded lock 602 of FIG. 6, the total number of locks held by the DML at any given time is the sum of the values of lock counts of the original lock and each expanded lock in use at that time.

Expanded lock 602 further includes a set of indicators. The set of indicators in expanded lock 602 may be modified or extended similar to the set of indicators in original lock 502 in FIG. 5. Read-mode indicator 606 may be an indicator in expanded lock 602. In one embodiment, read-mode indicator 606 may operate in a manner similar to read-mode indicator 508 in FIG. 5. In another embodiment, read-mode indicator 606 may be used to indicate whether expanded lock 602 is being used to hold only read locks or a combination of different types of locks.

Expanded lock 602 may also include upgraded indicator 608. In one embodiment, upgraded indictor 608 may correspond to upgraded indicator 512 original lock 502 in FIG. 5 to indicate that expanded lock 602 is an expanded lock in the upgrade of original lock 502 in FIG. 5. In another embodiment, upgraded indicator 608 may be utilized to indicate an upgrade of expanded lock 602 itself. For example, expanded lock 602 may be expanded with a set of expanded locks to handle any contention that may arise in the use of expanded lock 602. A set of expanded locks is one or more expanded locks.

As an example of other indicators that may be apparent from this disclosure, an implementation of expanded lock 602 may optionally include multi-bit lock-number indicator 610. Lock-number indicator 610 may be used instead of or in addition to index of expanded locks 518 in FIG. 5 to reference expanded lock 602.

Original lock 502 in FIG. 5 and expanded lock 602 in FIG. 6 may include any number of bits to store all of the described information. Original lock 502 or expanded lock 602 may further use any number of bits to store any particular piece of information. For example, any of the indicators, such as "read-mode" indicator or the "expandable" indicator, may be stored using more than one bit. Where a similar indicator is used in an original lock as well as an expanded lock, different numbers of bits may be used to hold the values of similar indicators.

Furthermore, these indicators may be modified, supplemented, augmented, enhanced, or otherwise changed to perform similar functions within the scope of the illustrative embodiments. These indicators are not intended to be a limiting set of indicators and are selected and described here only for the clarity of the illustrative embodiment. Additional indicators will become apparent from this disclosure and the same are contemplated within the scope of the invention.

The sets of indicators depicted in FIGS. 5 and 6 are arranged in an example way without limiting the bit positions any particular indicator may occupy within the scope of the invention. These and any other indicators may occupy any suitable bit in the memory space of original lock 502 in FIG. 5 or expanded lock 602 in FIG. 6 in any order without departing the scope of the invention.

With reference to FIG. 7, this figure depicts a block diagram of an example method of allocating processes or threads to specific original or expanded locks in a DML in accordance with an illustrative embodiment. Lock number 702 may be a number or an index associated with an original lock or a specific expanded lock in a DML. For example, lock number 702 may be an entry in index of expanded locks 518 that may reference a particular expanded lock in expanded locks 504 in DML 500 depicted in FIG. 5.

Thread 704 may be an example thread of an example process requesting to acquire or release a lock using the DML. Thread 704 is used only for the clarity of the description of the illustrative embodiment and is not intended to be limiting on the invention. Thread 704 may be a thread, a process, or any other mechanism that is capable of acquiring and releasing locks in a data processing environment.

Thread 704 may have an identifier associated there with that may be used to uniquely identify thread 704 in the data processing system where thread 704 may be executing. Thread identifier 706 may be one such identifier.

In one example embodiment, lock number 702 may be computed 708 from thread identifier 706 thereby forming an association, affinity, relationship, or assignment between thread 704 and the original or expanded lock associated with lock number 702. For example, an example DML may be using one original lock and four expanded locks at a given instance. Thread identifier 706 may be hashed to yield a number between 0 and 4. If the hash value is 0, thread 704 may be assigned to the original lock and all acquisitions or releases of locks that thread 704 performs with the associated resource are tracked using the original lock. Similarly, if the hash value is 1, 2, 3, or 4, thread 704 may be assigned to expanded lock 1, 2, 3, or 4 respectively.

In one embodiment, the has value may indicate which expanded lock to use for storing read locks, the write locks being stored in the original lock. In other words, the read lock is not stored in the original lock if the lock has been upgraded and the has value is used to identify the expanded lock where read locks should be stored. For example, hash value of 0 may indicate the use of reader lock 0 to store the read count where expanded locks 0, 1, 2, and 3 may be present.

Hashing is described only as an example of computation 708. Computation 708 may be any suitable computation that is usable to uniquely associate thread 704 with an index, number, or identifier of an original or expanded lock in a DML.

Figure 8:
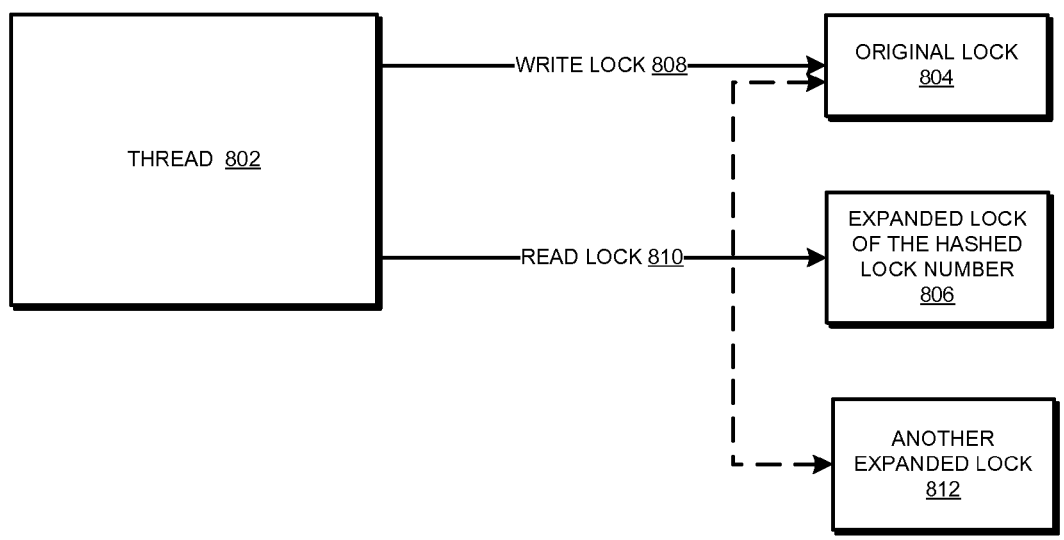
FIG. 8 depicts a block diagram of managing read and write locks using a DML in accordance with an illustrative embodiment.

With reference to FIG. 8, this figure depicts a block diagram of managing read and write locks using a DML in accordance with an illustrative embodiment. Thread 802 may be analogous to thread 704 in FIG. 7. Original lock 804 and expanded lock 806 may be the corresponding components of the DML used in the description of FIG. 7.

Expanded lock 806 may be referenced, indexed, or numbered by lock number 702 in FIG. 7. At the time of the configuration depicted in FIG. 8, thread 802 has been mapped to or otherwise associated with expanded lock 806 using that lock number.

According to an embodiment, when thread 802 requests to acquire write lock 808, the request for write lock 808 is directed to original lock 804. Requests to release write lock 808 are also directed to original lock 804. All atomic operations relating to acquisition or release of write lock 808 are performed using original lock 804.

When thread 802 requests to acquire read lock 810, the request for the read lock 810 can be directed to original lock 804 or expanded lock 806. Requests to release read lock 810 can be directed to original lock 804, expanded lock 806, or another expanded lock 812. All atomic operations relating to acquisition or release of read lock 810 are preferably performed using expanded lock 806. Atomic operations relating to acquisition or release of read lock 810 may be performed using original lock 804 or another expanded lock 812 when certain conditions exist relating to expanded lock 806 as described elsewhere in the disclosure.

Figure 9:
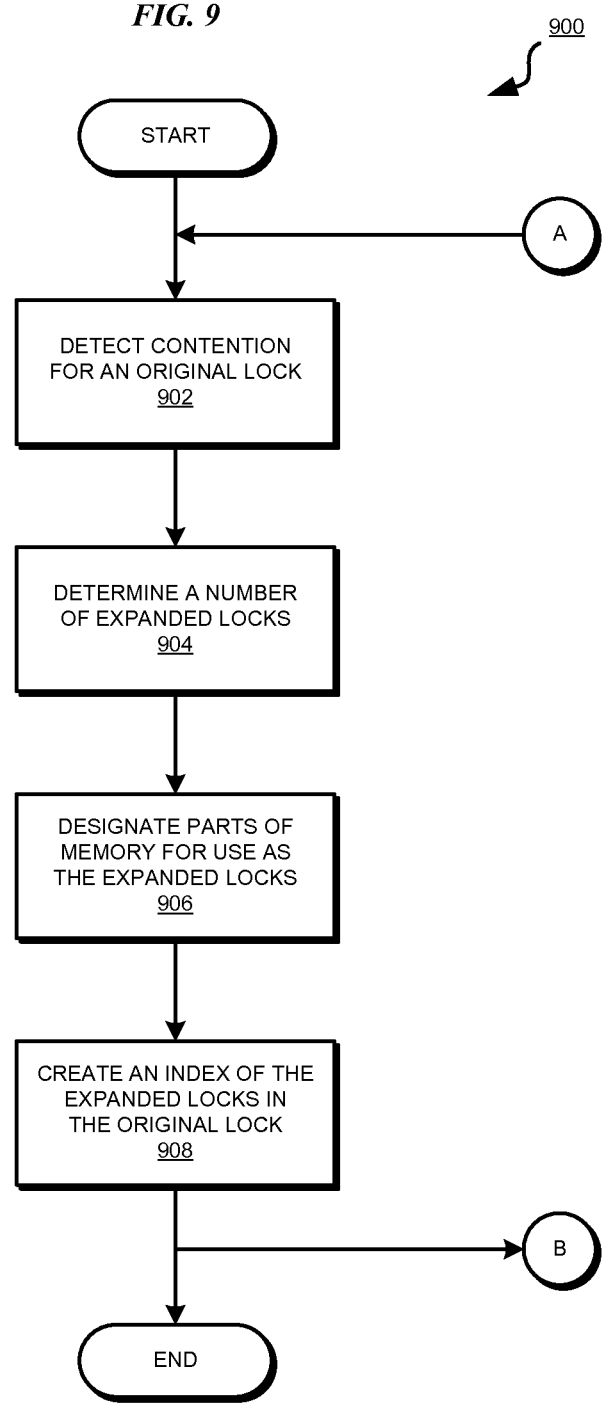
FIG. 9 depicts a flowchart of an example process of creating a DML in accordance with an illustrative embodiment.

With reference of FIG. 9, this figure depicts a flowchart of an example process of creating a DML in accordance with an illustrative embodiment. Process 900 may be implemented in an application that manages locks in a data processing system, such as an operating system or a component thereof.

Process 900 begins by detecting a contention condition for an original lock (step 902). Original lock in step 902 may be a presently used RWL, or an original lock as may be usable in a DML according to an embodiment.

If the original lock of step 902 is a presently used RWL, additional steps in process 900 (not shown) may transform the presently used RWL into an original lock as may be usable with an illustrative embodiment.

Process 900 determines a suitable number of expanded locks to use in conjunction with the original lock (step 904). Process 900 designates one or parts of memory for use as expanded locks (step 906).

Process 900 creates an index of the expanded locks in the original lock (step 908). Process 900 ends thereafter. In one embodiment in step 908, process 900 may store in an index of expanded locks of the original lock, an ordered list of addresses of the various memory locations where expanded locks have been created. In another embodiment, process 900 may store any another type of index in step 908. For example, step 908 may create a list of values that can be converted to reveal one or more such addresses of the expanded locks, the order of the expanded locks, or a combination thereof.

Figure 10:
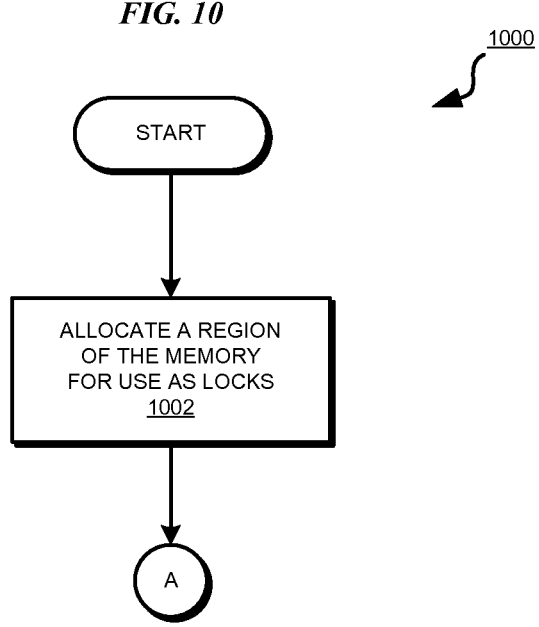
FIG. 10 depicts a flowchart of a process of allocating memory space for expanded locks in accordance with an illustrative embodiment.

With reference to FIG. 10, this figure depicts a flowchart of a process of allocating memory space for expanded locks in accordance with an illustrative embodiment. Process 1000 may be implemented in conjunction with process 900 in FIG. 9.

In one embodiment, memory space for use as locks may already be allocated prior to the start of process 900 in FIG. 9, such as by the operating system at boot time. In such an embodiment, process 900 may simply designate certain parts of that pre-allocated memory for use as expanded locks in step 906 of process 900 of FIG. 9.

In another embodiment, process 900 in FIG. 9 may be preceded by process 1000. Process 1000 begins by allocating a region of memory for use as locks (step 1002). Process 1000 may then execute process 900 in FIG. 9 at step 906 and end with the end of process 900 in FIG. 9. Step 906 in FIG. 9 may designate or allocate one or more parts of that memory for use as expanded locks in process 900 from the region of memory allocated in step 1002.

Figure 11:
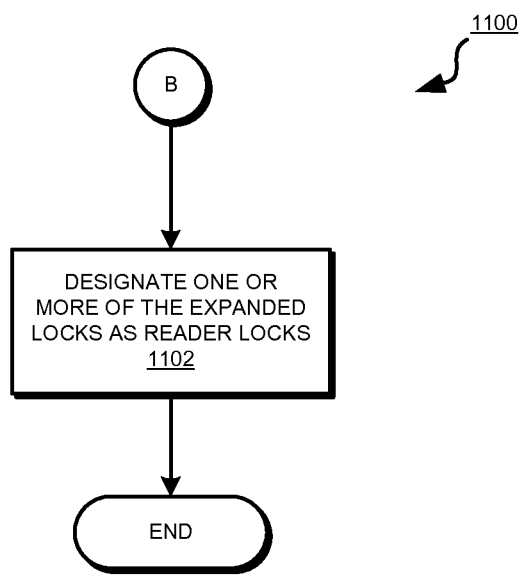
FIG. 11 depicts a flowchart of a process of specializing certain expanded locks in accordance with an illustrative embodiment.

With reference to FIG. 11, this figure depicts a flowchart of a process of specializing certain expanded locks in accordance with an illustrative embodiment. Process 1100 may be implemented in conjunction with process 900 in FIG. 9.

Following step 908 in FIG. 9, process 900 may execute process 1100. Process 1100 begins by designating one or more of the expanded locks as reader locks (step 1102). Process 1100 ends thereafter. For example, process 1100 may set a read-mode indicator bit in one or more expanded locks to indicate that those expanded locks are used for holding only read locks on the associated resource.

With reference to FIG. 12, this figure depicts a process of assigning threads or processes to specific original or expanded locks in a DML in accordance with an illustrative embodiment. Process 1200 may be implemented in an application that manages locks in a data processing system, such as an operating system or a component thereof.

Process 1200 begins by detecting an identifier associated with a thread or a process requesting a lock on a resource using the DML (step 1202). Process 1200 determines whether the request pertains to a read lock or a write lock (step 1204).

If the request is to acquire or release a read lock ("Read" path of step 1204), process 1200 computes a lock number or lock index to use for the lock request (step 1206). For example, process 1200 may hash the identifier from step 1202 to yield a number up to the total number of original and expanded locks for that resource.

Process 1200 assigns the thread's request to the lock corresponding to the computed lock number or index (step 1208). Process 1200 ends thereafter. Under certain conditions of the lock assigned in step 1208, process 1200 may perform additional steps or execute another process as described elsewhere in the disclosure. Such additional steps or another process may perform a lock operation using an original or expanded lock other than the assigned lock.

Returning to step 1204, if the request pertains to a write lock ("Write" path of step 1204), process 1200 assigns the thread's request to the original lock (step 1210). Process 1200 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, an apparatus and computer program product are provided in the illustrative embodiments for a dual mode reader writer lock. Using the embodiments of the invention, a data processing system can operate with improved efficiency under lock contention conditions. Using the embodiment, a data processing system can operate with improved efficiency also when a RWL is saturated and can hold no more locks.

A DML according to an embodiment can operate as a presently used RWL, using only the original lock configuration, when demand for the lock is below a threshold. When the demand for the lock reaches or exceeds the threshold, to wit, when a contention condition exists for the lock, the DML can transform to operate using expanded locks. In other words, a DML according to an embodiment can be upgraded to operate in the expanded mode or downgraded to operate in the original mode depending on the demand for the lock.

In one embodiment, an existing RWL may occupy less than 1 data word of space. In such an embodiment, the original lock and one or more expanded locks can be accommodated within 1 data word within the scope of the illustrative embodiments. Expanded locks have been described as holding reader locks only as some example embodiments of the invention. Upon suitable modifications, expanded locks can be used for holding a combination of types of locks, including write locks.

The embodiments of the invention can collaborate with existing lock management applications. The embodiments can also allow existing applications and processes to transparently use DML where they were only configured to use presently used RWLs. Furthermore, during use, DML mode can change while the applications and processes using the DML remain unaware of such transitions.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable device providing program code for use by or in connection with a computer or any instruction execution system. For the purposes of this description, a computer-usable or computer-readable device can be any hardware apparatus that can store the program for use by or in connection with the instruction execution system, apparatus, or device.

The device can be an electronic, magnetic, optical, electromagnetic, or semiconductor system (or apparatus or device). Examples of a computer-readable device include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage device may store a computer-readable program code such that when the computer-readable program code is executed on a computer, the execution of this computer-readable program code causes the computer to transmit another computer-readable program code. The terms "computer usable storage device," "computer usable hardware storage device," and "storage device" do not encompass a signal propagation medium any description in this disclosure to the contrary notwithstanding.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer usable program product comprising a computer usable hardware storage device including computer usable code for a dual mode reader writer lock, the computer usable code comprising:

computer usable code for receiving from a process of a plurality of processes, a first request to one of (i) acquire, and (ii) release, a read lock on a resource; and computer usable code for receiving from the process a second request to one of (i) acquire, and (ii) release, a write lock on the resource computer usable code for determining a contention condition in using an original lock, the original lock corresponding to the resource available on a data processing system, the original lock managing read access and write access to the resource by the plurality of processes executing in the data processing system;

computer usable code for creating a set of expanded locks for use in conjunction with the original lock, the original lock and the set of expanded locks forming the dual mode reader writer lock such that write access to the resource is acquired, held, and released using the original lock and the read access is acquired, held, and released using one of (i) the original lock and (ii) an expanded lock in the set of expanded locks, wherein a read-mode indicator in the original lock is set to a first value when the dual mode reader writer lock is used to manage read access only and the read-mode indicator in the original lock is set to a second value when the dual mode reader writer lock is used to manage a read access as well as a write access, modes of operation of the dual mode reader writer lock comprising a first mode of operating by using only the original lock as a reader writer lock (RWL) and a second mode of operating by using a combination of the original lock and at least one expanded lock from the set of expanded locks;

computer usable code for indexing using an index within the original lock, each expanded lock in the set of expanded locks such that each expanded lock is locatable using the index;

computer usable code for resolving the contention condition by distributing requests for acquiring and releasing the read access and write access to the resource by the plurality of processes across the original lock and the set of expanded locks by assigning the first request to the expanded lock in the set of expanded locks and assigning the second request to the original lock.

2. The computer usable program product of claim 1, wherein the original lock is a modified form of a preexisting reader writer lock such that the preexisting reader writer lock can hold a set of identifiers usable in operating in conjunction with the set of expanded locks, the computer usable program product further comprising:

computer usable code for designating an expanded lock in the set of expanded lock as a reader lock whereby the designated expanded lock is usable for acquiring, holding, and releasing only a read lock on the resource.

3. The computer usable program product of claim 1, wherein the expanded lock is selected from the set of expanded locks by computing an index value from an identifier associated with the process, the index value referring to the expanded lock.

4. The computer usable program product of claim 1, wherein the expanded lock is selected from the set of expanded locks such that the expanded lock has an affinity to a processor of the data processing system.

5. The computer usable program product of claim 1, further comprising:

computer usable code for receiving a request to one of (i) acquire, and (ii) release, a write lock on the resource; and computer usable code for assigning the request to the original lock in the dual mode reader writer lock.

6. The computer usable program product of claim 1, wherein the dual mode reader writer lock operates in a first mode using only the original lock when the contention condition does not exist, wherein the dual mode reader writer lock operates in a second mode using the original lock and the set of expanded locks when the contention condition exists, wherein the dual mode reader writer lock switches from the first mode to the second mode when the contention condition arises, and wherein the dual mode reader writer lock switches from the second mode to the first mode when the contention condition abates.

7. The computer usable program product of claim 6, wherein the switching from the first mode to the second mode removes the contention condition by allowing a plurality of atomic operations for locks on the resource to concurrently execute on one of (i) the original lock and an expanded lock in the set of expanded locks, and (ii) two expanded locks in the set of expanded locks.

8. The computer usable program product of claim 1, further comprising:

allocating a region in a memory for use as locks, wherein the creating the set of expanded locks designates a set of spaces for the set of expanded locks in the region.

9. The computer usable program product of claim 1, wherein the computer usable code is stored in a computer readable storage medium in a data processing system, and wherein the computer usable code is transferred over a network from a remote data processing system.

10. The computer usable program product of claim 1, wherein the computer usable code is stored in a computer readable storage medium in a server data processing system, and wherein the computer usable code is downloaded over a network to a remote data processing system for use in a computer readable storage medium associated with the remote data processing system.

\* \* \* \* \*